Patented Nov. 12, 1929

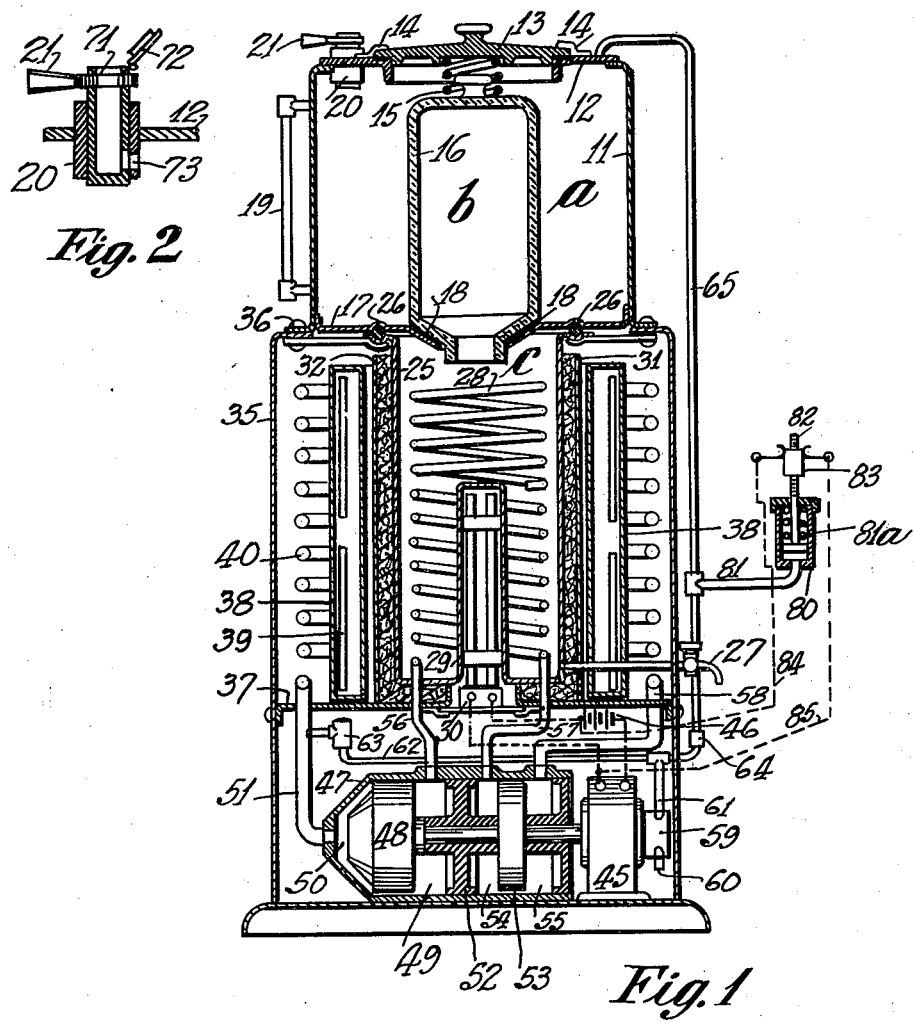

1,735,454

UNITED STATES PATENT OFFICE

HARRY W. DYER, OF NEW YORK, N. Y.

REFRIGERATING APPARATUS

Application filed March 26, 1926. Serial No. 97,790.

This invention relates to a refrigerating apparatus and relates specifically to an apparatus for cooling liquids and it also relates to a combined apparatus for filtering and cooling liquids. Its objects are to provide a portable cooling and filtering apparatus in a self contained unit, to provide a filtering apparatus that is automatically maintained under pressure and to provide for the regulation of said apparatus. Other objects, including the details of the construction will be more particularly understood from the following specification and the accompanying drawings, in which, Fig. 1 is a sectional elevation of an apparatus embodying my invention, Fig. 2 is a detail of the filling valve and Fig. 3 is a longitudinal section of a type of pump that may be used with this apparatus.

This invention includes a mechanical refrigerator for cooling a liquid such as drinking water in combination with a filter system in which the water is placed in a filter tank and forced under pressure through a filter medium into a cooling tank where it is subject to the action of mechanical refrigeration so as to maintain an even low temperature in the water as it is used. The mechanism which operates the mechanical refrigeration also operates the apparatus which maintains the pressure in the filter tank. This apparatus may be controlled by the temperature of the cooling tank and by the pressure of the filter system by an arrangement of automatic control.

The filter tank is placed on top of the device and through an opening in the cover, the filter element may be removed for inspection.

Referring to the drawings, 11 is the filter tank, enclosed by the top 12 and having the lid 13 which is held air tight on a gasket by the cleats 14. The filter medium 16 is preferably made from unglazed porcelain in the form of an elongated inverted jar as shown, with shoulders which bear upon the rubber gasket 18 and an orifice opening into the cooling chamber c. This filter element is maintained in a vertical position by the conical bearing surfaces 18 and by the spring 15 which holds it seated under pressure and centres it with lid 13. It will be noted that this lid is of such size as to permit removing the filter through the opening when the lid is removed.

The filter tank is enclosed by the bottom plate 17 and a water gage 19 shows the height of water in this tank. This tank is filled through the valve 20 controlled by the handle 21, best shown in the sectional drawing, in Fig. 2. The valve stem is hollow and has a port communicating with the opening 73 to the interior of the tank. A lid 72 covers the valve opening at 71 as shown. When in the position shown water can be poured into the tank through 71 and when the valve is turned around the opening 73 is closed and the filter tank is air tight.

The cooling tank c formed by the tubular wall 25 is connected to the bottom plate 17 of the filter tank by a water tight connection through the gasket 26. The cooled beverage is drawn off from this tank by 27. A tube 29 projects from the bottom into the cooling tank for receiving the thermostat 30 which is thus placed in intimate contact with the cooled liquid. The cooling tank is surrounded by an outer shell 31 which encloses the heat insulating covering 32 of the tank.

The refrigerating apparatus is enclosed by the shell 35 to which the filter tank is secured at 36. This shell is provided with a base plate 37 for supporting and enclosing the apparatus. An annular air duct 38 with openings 39 is preferably connected with a mechanical circulating system, not shown in the drawing, for creating an air circulation for cooling the coil 40.

The refrigerating mechanism is operated by the motor 45 which is driven by the source of power indicated by the battery 46. As shown in Fig. 1 the motor operates a pump and expander in the casing 47, the pump 48 being of the fan type and arranged to pump the gaseous refrigerant from the chamber 49 to the chamber 50 where it is led under pressure through pipe 51 to the cooling coil 40, and from the cooling coil it is led by pipe 58 to chamber 55 where it expands through the fan 53, mounted on the same shaft as 48 into chamber 54. From this chamber, after expansion, it is led by pipe 57 to the cooling tank c through the cooling coil 28, returning by pipe 56 to chamber 49, where it is again compressed by 48 and delivered to 51 to repeat the cycle in a closed circuit system.

A make-up pump is provided on the shaft of the motor 45 at 59 which takes in air at 60 and through pipe 61, 62 and check valve 63 maintains a supply of air in pipe 51 to compensate for any leakage that may arise in the system. In addition, this make-up pump, through the check valve 64 and pipe 65 maintains an air pressure in the filter tank a, for purposes hereafter described.

The circuit of the motor 45 is controlled by the thermostat 30 according to the temperature of the liquid in tank c; it is also controlled in multiple circuit by the pressure valve 80 according to the pressure in the filter tank. This valve connects by pipe 81 with pipe 65 so that it is subject to the pressure in tank a. This pressure, through the piston opposes spring 81$^a$ and raises plunger 82 to interrupt the motor circuit at 83 when a predetermined pressure has been reached. As the pressure falls, the motor circuit is reestablished through wires 84 and 85 and the pump is operated again until the predetermined pressure is restored.

Attention is here directed to the fact that the system described contemplates the use of air as a refrigerant and the make-up pump restores air to the sytem. It should be understood however that apart from maintaining pressure in the filter tank, the mechanical refrigerating apparatus used in carrying out this invention may be arranged to use other refrigerants than air or gas, such as the volatile liquids and the coil 28 may be placed outside of the cooling tank c. An example of another type of refrigerating apparatus used in a water cooler will be found in my U. S. Patent 1,415,231, of May 9, 1922.

The pump in Fig. 3 may be used as an alternative to the pump shown in Fig. 1. This pump is of the screw type in which the screws 76 and 77 are mounted on the motor shaft 75 and arranged by screw action to deliver the refrigerating medium between the chambers of the pump in the manner already described. Pumps of this type are preferred to plunger pumps which require valves and are noisy in operation.

In operation, the motor is connected with a source of electric supply. The tank a is filled with water close to the top of the gage through the valve 20. As the motor is operated the air pressure in a is built up which forces the water through the filter medium into b and into the cooling chamber c where it is cooled by the refrigerating coil 28 and drawn off as required at 27. Filters of the class described are usually connected by piping with a water pressure system and the air pressure in tank a is provided as a substitute for this pressure so that the apparatus can be installed as a unit without plumbing connections, and is readily portable.

When the pressure in tank a has reached a predetermined value the motor circuit is opened at 83 and the motor is then exclusively under the control of the thermostat which opens the motor circuit when a predetermined low temperature has been reached. As the water is used the temperature increases and also the pressure in tank a decreases, thus establishing the motor circuit again for cooling the liquid and restoring the pressure in the filter tank. The pressure at which valve 80 opens the motor circuit is adjustable by the screw connection between 83 and the stem 82.

Having thus described my invention, I claim:

1. In a portable refrigerator and filter, the combination of a liquid receptacle, a cooling chamber below said receptacle, an inverted hollow filter element interposed between said receptacle and said chamber, a refrigerator coil for cooling said chamber, a mechanism for forcing a refrigerant through said coil, a motor for operating said mechanism and means operated by said motor for maintaining an air pressure in said receptacle.

2. In a portable refrigerator and filter, the combination of a liquid receptacle, a cooling chamber, a filter element interposed between said receptacle and said cooling chamber, a refrigerating coil for said cooling chamber and a mechanism for forcing air through said coil as a refrigerating medium and a make-up pump for forcing air into said receptacle under pressure and for making up leakage in said refrigerating medium.

3. In a portable refrigerator and filter, the combination of a liquid receptacle, a cooling chamber, a filter element interposed between said receptacle and said cooling chamber, a refrigerating member for cooling said chamber, a mechanism for forcing a refrigerating medium through said member and for maintaining an air pressure in said receptacle and means controlling said mechanism by the pressure in said receptacle.

4. In a portable refrigerator and filter, the combination of a liquid receptacle, a cooling chamber, a filter element interposed between said receptacle and said cooling chamber, a refrigerating member for cooling said chamber, a mechanism for forcing a refrigerating medium through said member and for maintaining an air pressure in said receptacle and means controlling said mechanism by the temperature of said cooling chamber.

5. In a portable refrigerator and filter, the combination of a liquid receptacle, a cooling chamber, a filter element interposed between said receptacle and said cooling chamber whereby liquid from said receptacle is filtered before entering said cooling chamber and a refrigerating coil for cooling said chamber including a mechanism for forcing air through said coil and into said receptacle at the same pressure.

6. In a portable refrigerator and filter, the combination of a liquid receptacle, an inverted cylindrical filter element placed vertically in said receptacle and having an open end, a cooling chamber connected with the open end of said filter element, a refrigerating member for cooling said chamber and a mechanism automatically controlled by the temperature of said cooling chamber for forcing a refrigerating medium through said member.

7. In a self contained filter unit as described, the combination of a liquid receptacle, a cooling chamber and a filter element interposed between said receptacle and said cooling chamber and means, automatically controlled by the temperature of said cooling chamber, for maintaining an air pressure in said receptacle.

8. In a self contained filter and refrigerator unit as described, the combination of a liquid receptacle with a lid on the top, a filter element placed centrally in said receptacle and arranged to pass through the opening of the lid, means associated with said lid for holding said filter in position, a cooling chamber communicating directly with said filter and located below said filter, a refrigerating coil in said chamber, a mechanism for forcing a refrigerating medium through said coil and means for automatically controlling said mechanism.

9. In a self contained filter and refrigerator, the combination, a liquid receptacle, a removable filter element located in said receptacle and having a portion extending substantially from the bottom to the top of said receptacle, a heat insulated housing, a cooling chamber having an orifice in said housing, a refrigerating element for cooling said chamber, a motor operating a pump, said pump connected with said refrigerating element for circulating a refrigerating medium therein, a thermostat controlling said motor by the temperature of said cooling chamber, said removable filter element connected with the orifice of said chamber, means for holding said filter element in place and means whereby said filter element may be removed from said receptacle.

Signed at New York, in the county of New York and State of New York, this 16th day of March, A. D. 1926.

HARRY W. DYER.